April 2, 1963     B. O. BREKKE     3,083,930
WINDING FORM
Filed Aug. 13, 1959

INVENTOR.
BYRON O. BREKKE
BY Alfred N. Feldman
ATTORNEY

# United States Patent Office 3,083,930
Patented Apr. 2, 1963

3,083,930
WINDING FORM
Byron O. Brekke, Brooklyn Center, Minn., assignor to Minneapolis-Honeywell Regulator Company, Minneapolis, Minn., a corporation of Delaware
Filed Aug. 13, 1959, Ser. No. 833,563
5 Claims. (Cl. 242—118.4)

The present invention is directed to an improved winding form, and more particularly, to a winding form suitable for use with most all types of electrical and electromagnetic equipment.

The art of winding electrical coils for such devices as transformers, solenoids, inductors, relays, and other units has become very highly developed and in many cases has been automated. The production quantities of units utilizing electrical windings of this type run into the millions of units per year on many types and sizes of devices. Any savings that can be accomplished in the production of this tremendous number of units constitutes a substantial savings on an over-all basis for each year.

The winding of electrical coils on winding forms or bobbins has been known and used extensively for many years. In most recent years a trend has developed to increase the number of bobbin wound coils for transformers and relays, as bobbin winding has certain structural advantages over other forms of windings. This is particularly true where temperature becomes a problem, as bobbin wound coils can be manufactured conveniently of materials which withstand higher ambient temperatures than other types of low cost windings. In order to make bobbins wound coils practical from a cost standpoint, it became necessary to provide a simple arrangement for leading the initial wire from the center of the bobbin, or the winding portion of the form, to an external point or terminal. In the past, expedients such as holes either drilled or formed through the flange of the winding form or bobbin have been utilized. This arrangement has not been satisfactory in that it takes a considerable amount of manual dexterity and time to feed a small wire through such a hole at the beginning of the operation of winding a bobbin.

Some manufacturers have provided for the lead-out or beginning end of the wire to be brought out directly up along the inside of the flange from the winding portion to an external point or terminal. This type of winding requires an extra insulation to be inserted to protect the lead-out wire from the electrical potential difference occurring between the outer turns of the coil and the lead-out wire itself. This arrangement is cumbersome in production quantities as it requires handling the winding form, the wire, and insulating materials. It also leads to an unevenness as each turn of wire adjacent to the flange passes around the lead-out wire. Another form of bobbin that has been commonly used is one which includes a groove in the flange to protect the lead-out wire and this groove is then covered with a sheet of insulating material or a plastic insulating material is forced down into the groove to hold the lead-out wire away from the subsequent turns on the winding form.

All of the prior art arrangements noted above require a good deal of initial preparation before the coil body can be wound. While this preparation appears quite small on a per unit basis, when a single unit reaches production quantities in excess of millions per year, this relatively small cost item becomes a major expenditure. The presently disclosed winding form avoids the problems previously encountered in winding bobbin type coils, and in addition, lends itself to automatic winding at a substantial cost saving per unit. The presently disclosed invention is a bobbin type winding form which utilizes a slot in the flange of the winding bobbin, but the slot is unique in design which eliminates the need for any secondary insulating material either directly on the lead-out wire or placed against the bobbin itself. The slot is placed so that the lead-out wire is insulated from the subsequent turns of wire on the winding form. The present novel device is a form of winding bobbin with a compound slot which passes through a flange of the bobbin at a diagonal and which also has a slope which may vary from an initial slope as it passes upward through the flange of the bobbin. The slot further has a continuous opening extending from the winding portion to the edge of the bobbin flange so that a wire can be inserted from the inner side of the flange and pulled down into the slot thereby placing an insulated wall between the lead-out wire and the balance of the windings. The arrangement will be described in detail subsequently, but it should be noted that the primary object of the present invention is to disclose an improved winding form for electrical devices of all types.

It is a further object of the present invention to disclose a bobbin or winding form that is inexpensive to manufacture as it is a unitary, molded unit.

Yet another object of the present invention is to provide a winding form that is faster and simpler to wind because of the shape of a compound slot in the flange of the form.

Still a further object is to provide a winding form that is faster and easier to wind as the lead-out wire can be readily placed in the winding form.

The present invention further has as an object the disclosure of a winding form that has an insulated lead-out wire that is protected from both the subsequent turns of wire and from any mounting means associated with the unit or from laminations passing through the center of the winding form.

These and other objects will become apparent when a complete consideration of the specification and drawing is undertaken.

In the present drawing, a typical application of the present invention is disclosed, wherein.

Figure 1:
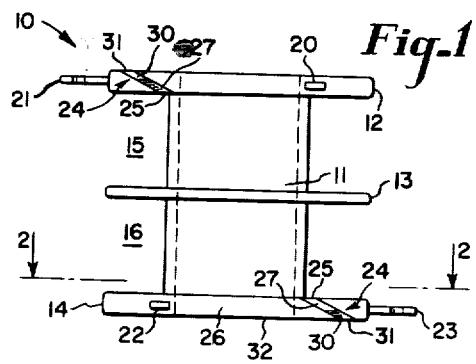
FIGURE 1 is an end view of a one-piece molded bobbin utilized for a conventional transformer.
Figure 4:
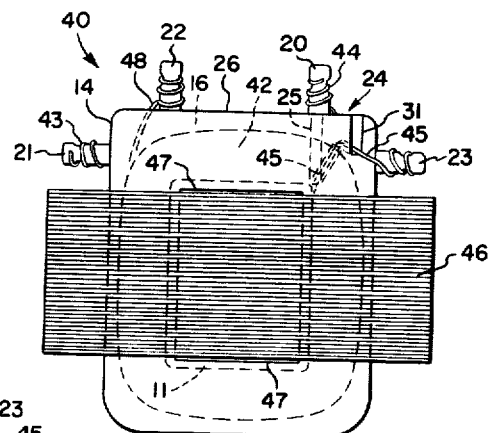
FIGURE 4 is a transformer disclosed from the same view as the winding form in FIGURE 3.
Figure 5:
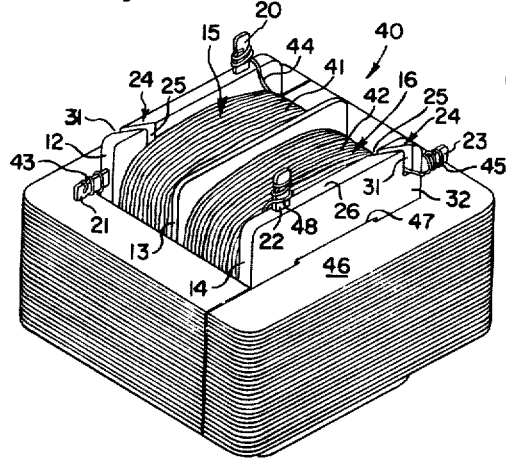
FIGURE 5 is an isometric view of the assembled transformer of FIGURE 4 utilizing the present invention.

In FIGURE 1 there is disclosed a winding form 10 whereon a coil can be formed by progressively adding turns of insulated wire in layers. The winding form 10 has a winding portion 11 and three flanges 12, 13, and 14. The flanges 12, 13, and 14 define two winding spaces generally indicated at 15 and 16. In the specific embodiment disclosed, the winding portions 15 and 16 can be utilized for the primary and secondary windings of a conventional type of transformer. This type of transformer is more specifically disclosed in FIGURES 4 and 5 and will be scribed in some detail after the explanation of the construction of the winding form 10.

Four terminals 20, 21, 22, and 23 are disclosed as inserted in the outermost parts of flanges 12 and 14. The terminals 20 through 23 can be of any convenient type and can be inserted into slots in the flanges 12 and 14 or can be molded into the flanges when the winding form 10 is initially fabricated. The details of the terminal structure form no part of the present invention but have been disclosed solely as a means of clarifying the application of the present invention to a usable, high production type item.

A compound type slot 24 is disclosed in each of the outer flanges 12 and 14. The slot 24 forms the basis of the present invention. The slot 24 in each of the flanges 12 and 14 are identical and the slot 24 will be explained in detail in connection with FIGURES 2 and 3 which show the inner and outer surfaces, respectively, of the flange 14. The slot 24 passes diagonally through the flange 14 as can best be seen in FIGURE 1. The diagonal slot 24 has an opening 25 which passes from the winding portion 11 to the peripheral edge 26 of the flange 14. The opening 25 in passing from the winding portion 11 to the peripheral edge 26 forms a means in communication with the winding space 16 so that a wire can be conveniently led out from the winding portion 11 to the exterior of the winding form 10, as will become more apparent in the discussion that follows.

Figure 6:
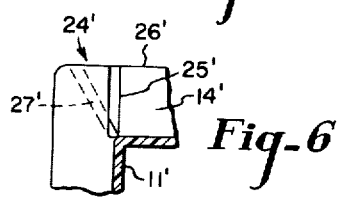
FIGURE 6 is a second embodiment of the novel bobbin slot.

The slot 24 has a sloped portion 27 that leads upward through the flange 14. Since the slot 24 has an upward type slope 27 and is cut diagonally through the flange 14, it can be readily considered as a slot having a compound slope wherein the area of intersection of the slot with the peripheral edge defines an opening a portion of which is spaced from the inner surface and is laterally spaced from the area of intersection of the slot with the inner surface. As such, one wall of the slot forms an insulating barrier between the winding space and a wire placed in the slot. In the presently disclosed embodiment the slot 24 further has a downward projecting portion 30 which leads to a second opening 31 in the end surface 32 of the flange 14. The outer opening 31 leads almost directly to terminal 23. It should be understood, however, that the slot 24 could have a continuous slope 27 which would rise and come out of the flange 14 at the peripheral edge 26 as shown in FIGURE 6. If this were the case the terminal 23 could be located in the edge 26 in a similar manner to terminal 22.

Figure 2:
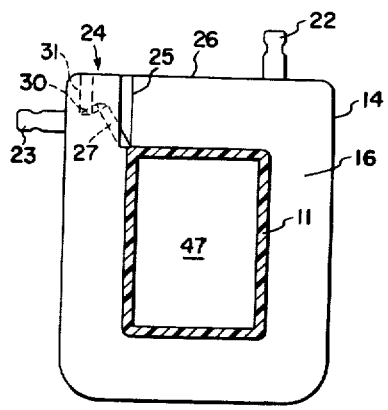
FIGURE 2 is a section along line 2—2 of FIGURE 1.
Figure 3:
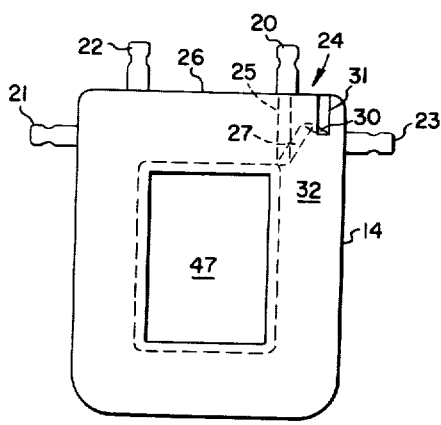
FIGURE 3 is a side view of the flange disclosed in FIGURES 1 and 2 showing the opposite side disclosed in FIGURE 2.

In considering the slot 24, most easily viewed in FIGURE 2, it can be seen that a wire being wound initially around the winding portion 11 could be led into the opening 25, which is in communication with the winding space 16, merely by laying the wire in the slot 24. The wire would then be led through the opening 31 to the terminal 23 to anchor the initial turn of wire prior to winding a coil on the winding portion 11. As the turns of wire were placed on the winding portion 11 thereby filling the winding space 16, the subsequent turns would progressively get further away from the lead-out turn of wire and would cover the opening 25 of slot 24. This arrangement will now be specifically discussed in connection with the transformer shown in FIGURES 4 and 5.

The transformer is generally shown at 40 and has a winding or group of turns of insulated wire 41 forming the primary of the transformer and a group of turns of insulated wire 42 forming the secondary of the transformer. The turns of wire 41 are placed in the winding space 15 while the secondary turns 42 are placed in the winding space 16. The flanges 12, 13, and 14 separate the windings and insulate them from one another. The primary winding 41 has a lead-out wire 43 which is attached to terminal 21 and which passes through slot 24 in flange 12 to the winding portion 11 in the winding space 15. The subsequent turns of wire of the winding 41 close the slot 24 by covering the opening 25 and the last turn of wire 44 is connected to terminal 20, to complete the primary winding of the transformer 40. A lead-out wire 45 is provided for the secondary 42 of the transformer 40 and the lead-out wire 45 is attached to terminal 23 after passing through slot 24 and the outer opening 31 in flange 14. Again the lead-out wire 45 is protected from the subsequent turns of the secondary winding 42 by being imbedded in the slot and being led by the compound arrangement of the slot in a direction away from the windings 42 and upward through the flange 14. An outer turn of wire 48 of the secondary 42 is connected to terminal 22 to complete the secondary of the transformer. A group of laminations 46 is provided through the center 47 of the winding portion 11 in a conventional manner. The stack of transformer laminations 46 are disclosed as of a double F type which have an interlocking leg in the space 47. This type of transformer is well known to those versed in the art and will not be described in additional detail.

As previously mentioned the compound slot 24 could be modified utilizing a single upward slope rather than the double slope 27 and 30. This modification is shown in FIGURE 6. A flange 14' has a slot 24' and an opening 25' formed therein. A part of the winding portion 11' is also disclosed. The slot 24' has an upward extending slope 27' which comes to the peripheral edge 26' without having the reverse slope as shown at 30 in FIGURE 2. The function of the slot disclosed in FIGURE 6 is the same as that in FIGURE 2. The compound slope of the slot 24' protects the lead-out turn of wire from the winding portion 11' and from the subsequent turns of wire. This allows for the lead-out turn of wire to be brought to the peripheral edge 26' in a fully protected and insulated manner while still allowing for the lead-out wire to be merely laid into the form initially prior to winding of the unit.

While the present invention has been specifically disclosed as being incorporated in a two-coil arrangement for a transformer, it is obvious that the present invention could be utilized in any type of electrical device utilizing a winding. This would include single coil devices such as relays, inductors, and certain types of transformers utilizing a single winding space. Since the present invention can be incorporated into many devices and can be utilized in various forms that would be obvious to one versed in the art, the applicant wishes to be limited in the scope of the present invention only by the appended claims.

I claim as my invention:

1. A bobbin type of winding form whereon electric coils are formed by progressively adding turns of insulated wire in layers in winding spaces comprising: a winding portion and three flanges attached to said winding portion to define two winding spaces; said flanges each having a peripheral edge; two of said flanges further having slots formed therein; and said slots having openings in communication with said winding spaces from said winding portion to said peripheral edges; said slots passing diagonally through said flanges from said winding spaces, and further having a variable slope which begins at said winding portion and approaches the peripheral edge of said flanges to provide an insulated lead-out passage for said wire from said winding portion of said winding form.

2. A winding form whereon an electric coil is formed by progressively adding turns of an insulated wire in layers in a winding space comprising: a winding portion and two flanges attached to said winding portion to define said winding space; said flanges including a peripheral edge; at least one of said flanges having a slot formed therein; and said slot having an opening in communication with said winding space from said winding portion to said peripheral edge; said slot passing diagonally through said flange from said winding space; said slot further having a variable slope which begins at said winding portion and approaches the peripheral edge of said flange to provide an insulated lead-out passage for said wire from said winding portion of said winding form.

3. A winding form whereon an electric coil is formed by progressively adding turns of an insulated wire in layers in a winding space comprising: a winding portion and an outer flange attached to said winding portion to partially define said winding space and to define an outer wall of said winding form; said flange having a peripheral edge and a slot formed therein; said slot having an opening in communication with said winding space from said winding portion to said peripheral edge and said slot further passing diagonally through said flange from said winding space; and said slot beginning at said winding portion and opening to said peripheral edge to provide a leadout passage for said wire from the innermost layer of wire adjacent said winding portion of said winding form to said peripheral edge in which passage the inner wall of said slot forms an insulating barrier between said wire and the outer layers of wire in said winding space.

4. A winding form whereon an electric coil is formed by progressively adding turns of an insulated wire in layers in a winding space comprising: a winding portion and two flanges attached to said winding portion to define said winding space, one of said flanges being an outer flange forming an outer wall of said winding form; each of said flanges including a peripheral edge, an outer surface, and an inner surface defining a wall of said winding space; said outer flange having a slot formed therein and extending from the inner surface of the flange in communication with said winding space through said peripheral edge thereof; the intersection of said slot with said inner surface extending continuously from said winding portion to said peripheral edge of said flange and the area of intersection of said slot with said peripheral edge defining an opening a portion of which is spaced from said inner surface and is laterally spaced from the area of intersection of said slot with said inner surface so that the inner wall of said slot forms an insulating barrier between outer layers of wire in the winding space and a wire placed in said slot and extending from the innermost layer adjacent said winding portion out through said portion of said opening in said peripheral edge, and the initial portion of said slot adjacent the intersection with said inner surface being separated from said outer surface by the material of said flange along any plane passing through said last named intersection and perpendicular to said outer surface so that the other wall of said slot forms a continuous insulating barrier between the outer surface of said flange and such a wire until it leaves said slot.

5. A winding form whereon an electric coil is formed by progressively adding turns of an insulated wire in a winding space comprising: a winding portion and an outer flange attached to said winding portion to define an end of said winding space and an outer wall of said winding form; said outer flange including a peripheral edge, an outer surface, and an inner surface defining a wall of said winding space; a slot formed in said flange and extending from the inner surface of the flange in communication with said winding space outwardly through said peripheral edge thereof; the intersection of said slot with said inner surface extending continuously from said winding portion to said peripheral edge of said flange and the area of intersection of said slot with said peripheral edge defining an opening a portion of which is spaced from said inner surface and is laterally spaced from the area of intersection of said slot with said inner surface so that the inner wall of said slot forms an insulating barrier between outer layers of wire in the winding space and a wire placed in said slot and extending from the innermost layer adjacent said winding portion out through said portion of said opening in said peripheral edge, and the initial portion of said slot adjacent the intersection with said inner surface being separated from said outer surface by the material of said flange along any plane passing through said last named intersection and perpendicular to said outer surface so that the other wall of said slot forms a continuous insulating barrier between the outer surface of said flange and such a wire until it leaves said slot.

References Cited in the file of this patent

UNITED STATES PATENTS

| | | |
|---|---|---|
| 335,749 | Fries | Feb. 9, 1886 |
| 1,014,780 | Smith | Jan. 16, 1912 |
| 1,274,776 | Preissner | Aug. 6, 1918 |
| 1,944,870 | Apple | Jan. 30, 1934 |
| 2,375,309 | McCoy | May 8, 1945 |
| 2,594,915 | Guillemant | Apr. 29, 1952 |

FOREIGN PATENTS

| | | |
|---|---|---|
| 592,463 | Great Britain | Sept. 18, 1947 |
| 1,050,118 | France | Aug. 26, 1953 |

UNITED STATES PATENT OFFICE
CERTIFICATE OF CORRECTION

Patent No. 3,083,930

April 2, 1963

Byron O. Brekke

It is hereby certified that error appears in the above numbered patent requiring correction and that the said Letters Patent should read as corrected below.

Column 5, line 38, and column 6, line 27, for "other", each occurrence, read -- outer --.

Signed and sealed this 17th day of December 1963.

(SEAL)
Attest:

ERNEST W. SWIDER
Attesting Officer

EDWIN L. REYNOLDS

Acting Commissioner of Patents

Disclaimer

3,083,930.—*Byron O. Brekke*, Brooklyn Center, Minn. WINDING FORM.
   Patent dated Apr. 2, 1963. Disclaimer filed Apr. 21, 1969, by the assignee, *Honeywell Inc.*
   Hereby enters this disclaimer to claims 1 through 5 of said patent.
   [*Official Gazette September 23, 1969.*]